United States Patent
Martin et al.

Patent Number: 6,154,813
Date of Patent: Nov. 28, 2000

[54] CACHE MANAGEMENT SYSTEM FOR CONTINUOUS MEDIA SYSTEM

[75] Inventors: Clifford Eric Martin, Martinsville; Pudugramam S. Narayanan, Plainfield; Banu Ozden, Summit; Rajeev Rastogi, New Providence; Abraham Silberschatz, Summit, all of N.J.

[73] Assignee: Lucent Technologies Inc., Murray Hill, N.J.

[21] Appl. No.: 08/996,691

[22] Filed: Dec. 23, 1997

[51] Int. Cl.$^7$ ........................................ G06F 12/08
[52] U.S. Cl. ............................. 711/133; 709/203
[58] Field of Search .................... 711/118, 134, 711/136, 137, 218, 133; 709/203

[56] References Cited

U.S. PATENT DOCUMENTS

| | | | |
|---|---|---|---|
| 4,533,995 | 8/1985 | Christian et al. | 711/122 |
| 5,134,563 | 7/1992 | Taylor et al. | 711/143 |
| 5,682,500 | 10/1997 | Vishlitzky et al. | 711/113 |
| 5,870,551 | 2/1999 | Ozden | 711/137 |
| 5,983,324 | 11/1999 | Ukai et al. | 711/137 |

*Primary Examiner*—Hiep T. Nguyen
*Attorney, Agent, or Firm*—Ryan, Mason & Lewis, LLP

[57] ABSTRACT

A cache management scheme is disclosed for buffering one or more continuous media files being simultaneously accessed from a continuous media server by a plurality of media clients. The continuous media server stores pages of data that will likely be accessed in a cache or buffer. The continuous media server implements a cache management strategy that exploits the sequential page access patterns for continuous media data, in order to determine the buffer pages to be replaced from the cache. The cache management strategy initially identifies unpinned pages as potential victims for replacement. Each unpinned page is evaluated by the continuous media server and assigned a weight. Generally, the assigned weight ensures that a buffer with a larger weight will be accessed by a client later in time than a buffer with a smaller weight. A page associated with a larger weight will be accessed later and hence, is replaced earlier. A current buffer list is preferably allocated to monitor the buffer pages associated with a given continuous media file. The current buffer list is a data structure pointing to a set of buffer pages in the cache buffer containing the currently buffered pages of the associated continuous media file. Each buffer page in the buffer cache is preferably represented by a buffer header. The current buffer list (CBL) data structure preferably stores, among other things, a pointer to the buffer pages associated with the CBL, identifier information for the CBL and related continuous media file, and information regarding the number of buffered pages associated with the CBL and number of clients currently accessing the associated continuous media file. The buffer header is a data structure containing information describing the state of the corresponding page. The buffer header preferably includes, among other things, a pointer to an actual area of the buffer cache storing a page of data, a number of pointers to create various relationships among the various pages in a CBL, and a fixed count indicating the number many of clients currently accessing the corresponding page of the continuous media file.

26 Claims, 7 Drawing Sheets

CURRENT BUFFER LIST DATA STRUCTURE

| 212 | CBL ID |
|---|---|
| 214 | FILE ID/DESCRIPTOR |
| 216 | BUFFER PAGE COUNTER |
| 218 | LOW/HIGH LOGICAL PAGE NUMBERS |
| 220 | LOW/HIGH BUFFER HEADER INDEX |
| 222 | CLIENT COUNTER |
| 224 | HEAD OF CLIENT LIST |
| 226 | POINTER TO HASH ARRAY |

BUFFER HEADER DATA STRUCTURE

| 252 | POINTER TO CACHE PAGE |
|---|---|
| 254 | FREE BUFFER POINTER |
| 256 | CBL LOGICAL PAGE POINTER |
| 258 | HASH ARRAY BUCKET POINTER |
| 262 | INDEX |
| 264 | CBL ID/PAGE ID |
| 266 | DIRTY STATUS |
| 268 | FIXED COUNT |

CACHE MANAGEMENT SYSTEM FOR CONTINUOUS MEDIA SYSTEM

FIELD OF THE INVENTION

The present invention relates to a cache management scheme, and more particularly, to a cache management scheme for continuous media data, such as audio or video.

BACKGROUND OF THE INVENTION

Caching is a technique for storing data in fast memory that will likely be accessed within a short period of time. Conventionally, a cache consists of a number of frames or pages of data stored in a random access memory (RAM), where each page is a physically contiguous chunk of bytes. When a requested page is found in the cache, it is called a "cache hit," while a "cache miss" occurs when a requested page is not resident in the cache. A page that contains updated data that has not been reflected on the disk is called a dirty page.

If a page from the disk needs to be brought into the cache, and if there are no free pages available in the cache, then the desired page can be brought into the cache by overwriting a clean page or by flushing a dirty page to the disk. The goal of an efficient cache management strategy is to maximize cache hits and minimize the number of cache misses by executing a strategic page replacement policy. Cache management consists of strategically maintaining the pages in the cache in such a manner that the pages are available in the cache whenever an application makes a request for them.

Video on demand and other continuous media applications require data to be stored and retrieved at predefined rates. For example, video data compressed using the MPEG-1 standard requires a transfer rate of 1.5 Mbps. Real time clients typically access continuous media sequentially. In addition, multiple clients may be accessing the same data simultaneously, although with phase differences. Typically, when replacing pages in the buffer cache and prefetching data into the buffer cache for multiple clients, file systems and storage servers do not exploit the fact that accesses to continuous media data tends to be sequential in nature.

Many caching schemes have been proposed or suggested in many commercial and academic software systems. The least recently used (LRU) page replacement policy is the standard method in conventional operating system file systems. The least recently used (LRU) strategy selects the page that has not been used for the longest period of time since the last cache miss condition as the replacement victim for a newly desired page. Other replacement policies include the least frequently used (LFU) and most recently used (MRU) policies, or hybrids thereof.

As apparent from the above-described deficiencies with conventional cache management strategies, a need exists for a server cache management system that exploits the sequential nature of continuous media data access. A further need exists for a cache management system that provides increased throughput. Yet another need exists for a cache management system that utilizes simple data arrays to keep track of pages. A further need exists for a cache management system that more efficiently processes real time clients, and therefore has additional time for processing non-real time clients.

SUMMARY OF THE INVENTION

Generally, a cache management scheme is disclosed for buffering one or more continuous media files being simultaneously accessed from a continuous media server by a plurality of media clients. In order to optimize performance, the continuous media server stores pages of data that will likely be accessed within a short period of time by one or more media clients in a cache or buffer. According to an aspect of the invention, the continuous media server implements a cache management strategy that exploits the sequential page access patterns for continuous media data, in order to determine the buffer pages to be replaced from the cache.

The cache management strategy initially identifies unpinned pages as potential victims for replacement. Each unpinned page is evaluated by the continuous media server and is assigned a weight. Generally, the basic strategy associated with the weighting disclosed herein is that a buffer with a larger weight will be accessed by a client later in time than a buffer with a smaller weight. Thus, the present invention assumes that clients are progressing in the forward direction at their respective data rates and no client has paused. A page associated with a larger weight will be accessed later and hence, should be replaced earlier.

In order to monitor the buffer pages associated with a given continuous media file, the continuous media server preferably allocates a current buffer list, for each continuous media file being accessed. The current buffer list is a data structure pointing to a set of buffer pages in the cache buffer containing the currently buffered pages of the associated continuous media file. Each buffer page in the buffer cache is preferably represented by a buffer header. A number of preferred data structures are disclosed for storing information about each current buffer list and each buffer page. Generally, the current buffer list (CBL) data structure stores, among other things, a pointer to the buffer pages associated with the CBL, identifier information for the CBL and related continuous media file, and information regarding the number of buffered pages associated with the CBL and number of clients currently accessing the associated continuous media file.

Each buffer header preferably points to a buffer page in the buffer cache that contains data of a continuous media file. The buffer header is a data structure containing information describing the state of the corresponding page. The buffer header preferably includes, among other things, a pointer to an actual area of the buffer cache storing a page of data, as well as a number of pointers to create various relationships among the various pages in a CBL. In addition, the buffer header includes a fixed count indicating the number of clients currently accessing the corresponding page of the continuous media file.

A more complete understanding of the present invention, as well as further features and advantages of the present invention, will be obtained by reference to the following detailed description and drawings.

DETAILED DESCRIPTION

Figure 1:
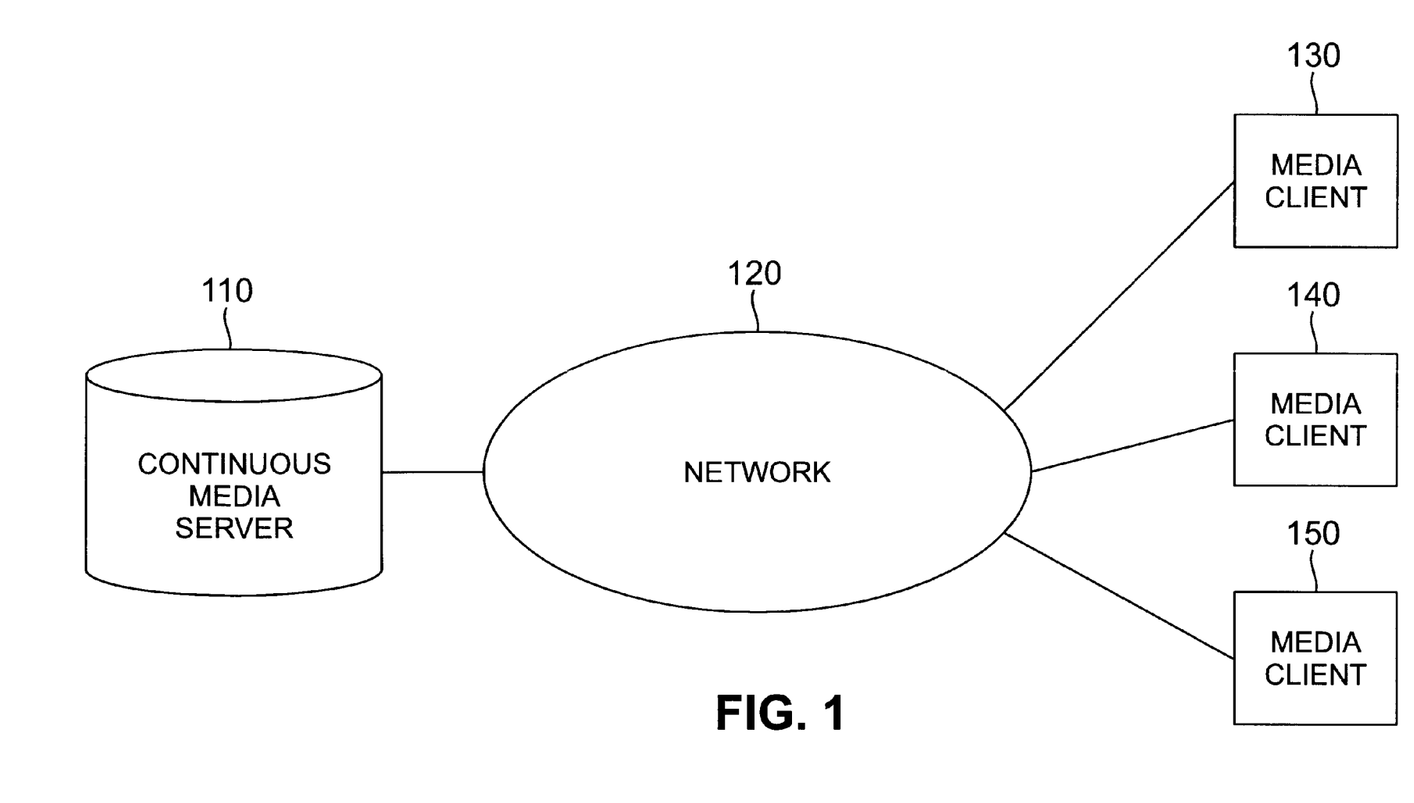
FIG. 1 is a block diagram of a network environment for interconnecting a continuous media server with a plurality of media clients.

FIG. 1 shows an illustrative network environment for transferring multimedia information, such as video, audio and data, between a continuous media server 110, discussed further below in conjunction with FIG. 3, and one or more media clients, such as media clients 130, 140, 150, over one or more external networks, such as the network 120. According to a feature of the present invention, the continuous media server 110 may be embodied, for example, as a video-on-demand system, and stores a plurality of continuous media files for delivery to the media clients 130, 140, 150.

As used herein, each continuous media file stored by the continuous media server 110 consists of a set of pages. The logical order of the pages is the order in which a client would normally read the file in the forward direction. Thus, every page in the file can be identified by a logical page number, depending upon its position from the beginning of the file. For example, a file having thirty (30) bytes of data with ten (10) bytes of data per page will have three (3) pages with logical page numbers 0 through 2.

The continuous media server 110 and media clients 130, 140, 150 (collectively, the "nodes") preferably transmit digitally encoded data and other information between one another. The communication links between the nodes preferably comprise a cable, fiber or wireless link on which electronic signals can propagate. For example, each node may be connected via an Internet connection using the public switched telephone network (PSTN), such as those provided by a local or regional telephone operating company. Alternatively, each node may be connected by dedicated data lines, cellular, Personal Communication Systems ("PCS"), microwave, or satellite networks.

CACHE SYSTEM

In order to optimize performance, the continuous media server 110 stores pages of data that will likely be accessed within a short period of time by one or more media clients 130, 140, 150 in a cache or buffer. The terms buffer and cache are used herein interchangeably. According to a feature of the present invention, the continuous media server 110 implements a cache management strategy that exploits the sequential page access patterns for continuous media data, in order to determine the buffer pages to be replaced from the cache. In order to monitor the buffer pages associated with a given continuous media file, the continuous media server 110 preferably allocates a current buffer list 210, shown in FIGS. 2A and 2B, for each continuous media file being accessed. The current buffer list 210 is a data structure pointing to a set of buffer pages 230 in the cache buffer containing the currently buffered pages of the associated continuous media file. Each buffer page 230 (FIG. 2A) in the buffer cache 240 is preferably represented by a buffer header 250, shown in FIG. 2B and 2C. Thus, each buffer header 250 points to a buffer page 230 in the buffer cache 240 that contains data of a continuous media file.

Figure 2A:
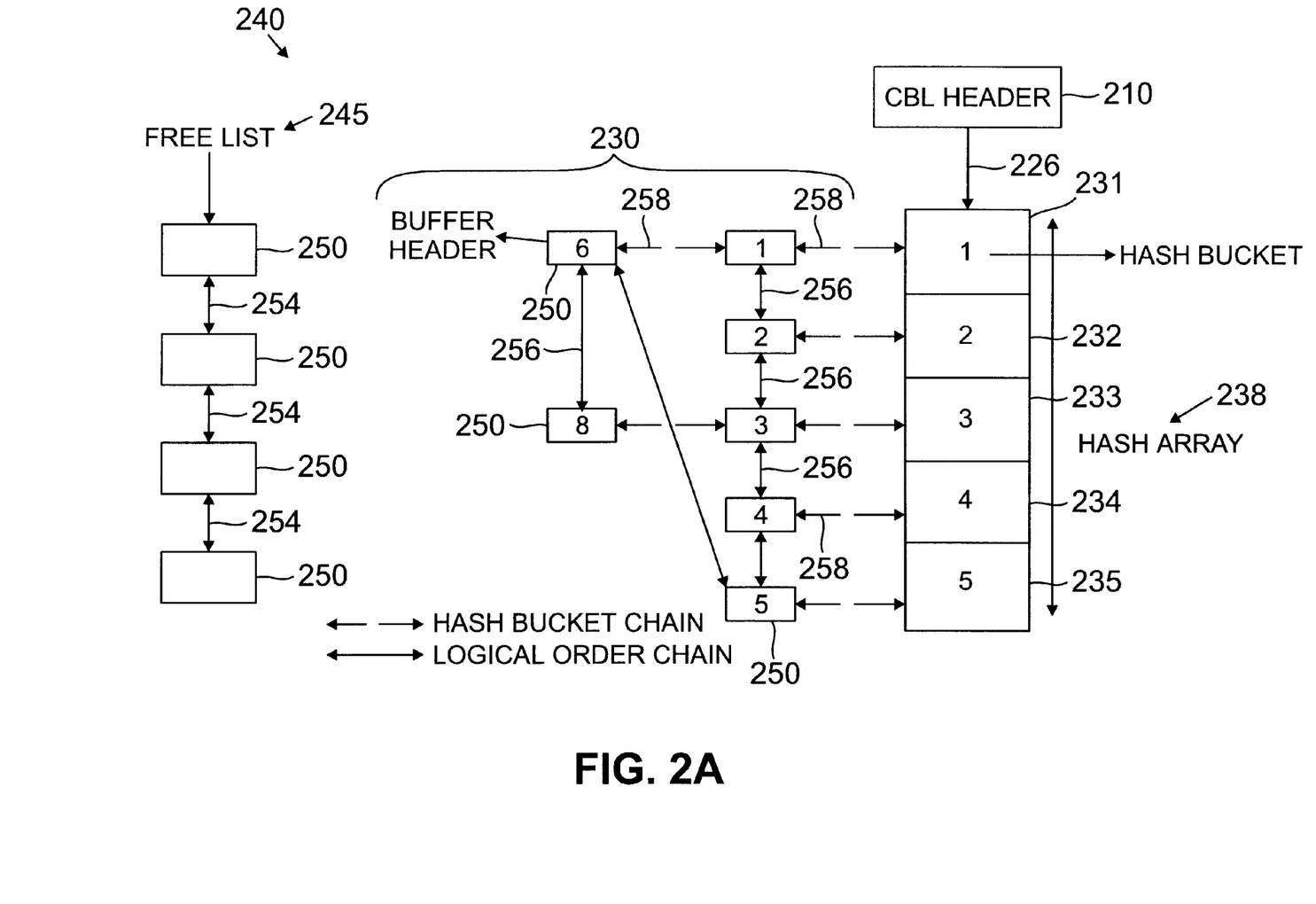
FIG. 2A is a block diagram illustrating the relationship of various data structures used by the continuous media server of FIG. 1 to implement a buffer cache in accordance with one embodiment of the present invention.

FIG. 2A illustrates the relationship of a current buffer list 210 which points to a set of related buffer pages 230, represented by buffer headers 250. Each current buffer list 210 is associated with a given continuous media file being accessed. As shown in FIG. 2A, every buffer page 230 in a continuous media file is hashed into an array of buckets 231 through 235. The specific bucket 231–235 is given by the simple modulo division of the logical page number and the size of the hash array 238. Thus, given a logical page number and its CBL identifier (discussed below in conjunction with FIG. 2C), the continuous media server 110 can determine if the page already exists in a bucket 231–235 of the buffer cache 240. As discussed below in conjunction with FIG. 2C, the buffer header 250 associated with each page 250, contains a chain linked pointer 258 hashing into the same bucket 231–235, in the increasing order of the logical page number.

Figure 2B:
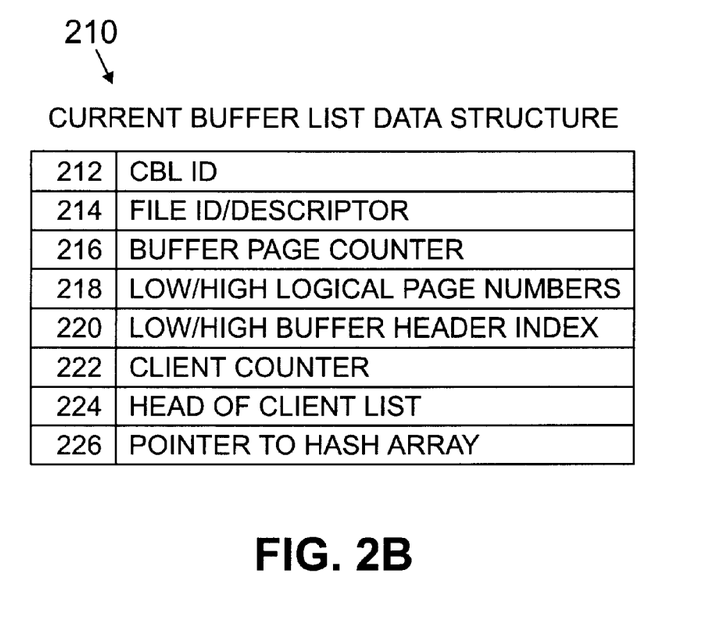
FIG. 2B is a diagram illustrating an exemplary current buffer list data structure of FIG. 2A.

As previously indicated, a current buffer list 210 is preferably allocated for each continuous media file being accessed. The current buffer list 210 data structure points to a set of buffer pages 230 in the cache buffer containing the currently buffered pages of the associated continuous media file. As shown in FIG. 2B, the current buffer list 210 includes an identifier 212 of the CBL and a file identifier/file descriptor member 214 containing information utilized by the operating system and server 110 to access the file on the disk and to ensure that all clients accessing the same continuous media file utilize the same CBL. In addition, the current buffer list 210 includes a buffer page counter 216 containing the total number of pages in the continuous media file which are currently stored in the buffer, as well as members 218, 220 containing the logical page numbers and header indexes of the lowest and highest logical pages, respectively. The current buffer list 210 also contains a client counter 222 indicating the number of clients currently accessing the continuous media file, as well as a pointer 224 to the head of a linked list of such clients. Finally, as previously indicated, the current buffer list 210 includes a pointer 226 to the hash array 238 (FIG. 2A).

Figure 2C:
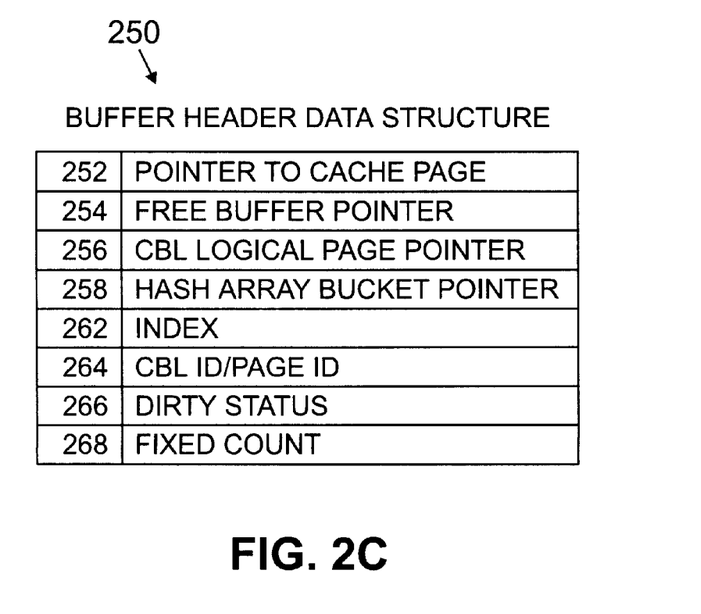
FIG. 2C is a diagram illustrating an exemplary buffer header data structure of FIG. 2A.

As previously indicated, each buffer header 250 points to a buffer page 230 in the buffer cache 240 that contains data of a continuous media file. As shown in FIG. 2C, the buffer header 250 is a data structure containing information describing the state of the corresponding page. The buffer header 250 includes a pointer 252 to an actual area of the buffer cache 240 storing a page of data. In addition, in order to implement the buffer page relationship shown in FIG. 2A, the buffer header 250 data structure preferably includes a number of pointer members 254 through 258. Specifically, a free buffer pointer 254 is utilized to implement a chain-linked free list 245 (FIG. 2A) of buffer pages 250 that are currently available. A CBL logical page pointer 256 is utilized to logically chain the buffer pages 250 in a CBL. As previously indicated, a hash array bucket pointer 258 hashes each page into the appropriate bucket 231–235, in the increasing order of the logical page number.

In addition, the buffer header 250 includes a number of members 262 through 268 for storing status information associated with the buffer page 230. In one embodiment, the buffer header 250 includes a buffer index 262 indicating the position of the respective buffer header 250 in the array of buffer headers, a CBL identifier/page identifier 264 for identifying the CBL to which the buffer header 250 belongs and the logical page number of the corresponding page, respectively, a dirty status field 266 that is set if the corresponding page was modified and not yet flushed to the disk, and a fixed count 268. The fixed count 268 indicates the number of clients currently accessing the corresponding page of the continuous media file.

Preferably, at system startup, the server process allocated space for a number of buffer pages 250 of arbitrary size, configurable according to the machine RAM size and performance requirements. All the buffer pages 230 are initially free and reside in the free list 245. The buffer headers 250 associated with each page 250 are initialized with a fixed count equal to zero, and doubly linked to each other, using the free list pointers 254. In addition, the server process preferably allocates space for a configurable number of CBLs and their corresponding hash arrays.

Figure 3:
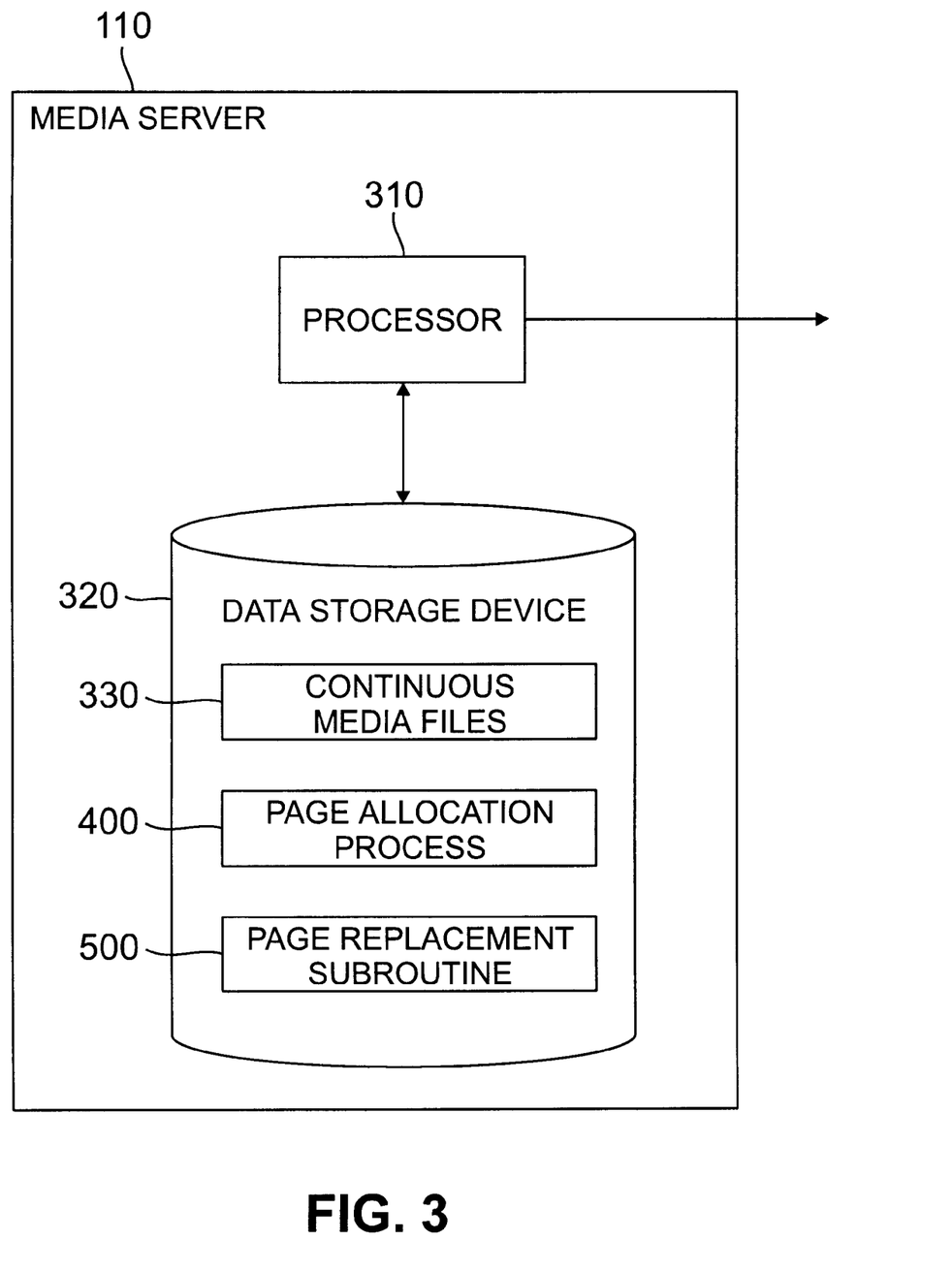
FIG. 3 is a block diagram illustrating the continuous media server of FIG. 1.

FIG. 3 is a block diagram showing the architecture of an illustrative continuous media server 110. The continuous media server 110 preferably includes a processor 310 and related memory, such as a data storage device 320. The processor 310 may be embodied as a single processor, or a number of processors operating in parallel. The data storage device 320 and/or a read only memory (ROM) are operable to store one or more instructions, which the processor 310 is operable to retrieve, interpret and execute. The processor 310 preferably includes a control unit, an arithmetic logic unit (ALU), and a local memory storage device, such as, for example, an instruction cache or a plurality of registers, in a known manner. The control unit is operable to retrieve instructions from the data storage device 320 or ROM. The ALU is operable to perform a plurality of operations needed to carry out instructions. The local memory storage device is operable to provide high-speed storage used for storing temporary results and control information. As previously indicated, the continuous media server 110 may be embodied, for example, as a video-on-demand system, and stores a plurality of continuous media files 330 for delivery to media clients 130, 140, 150.

Figure 4:
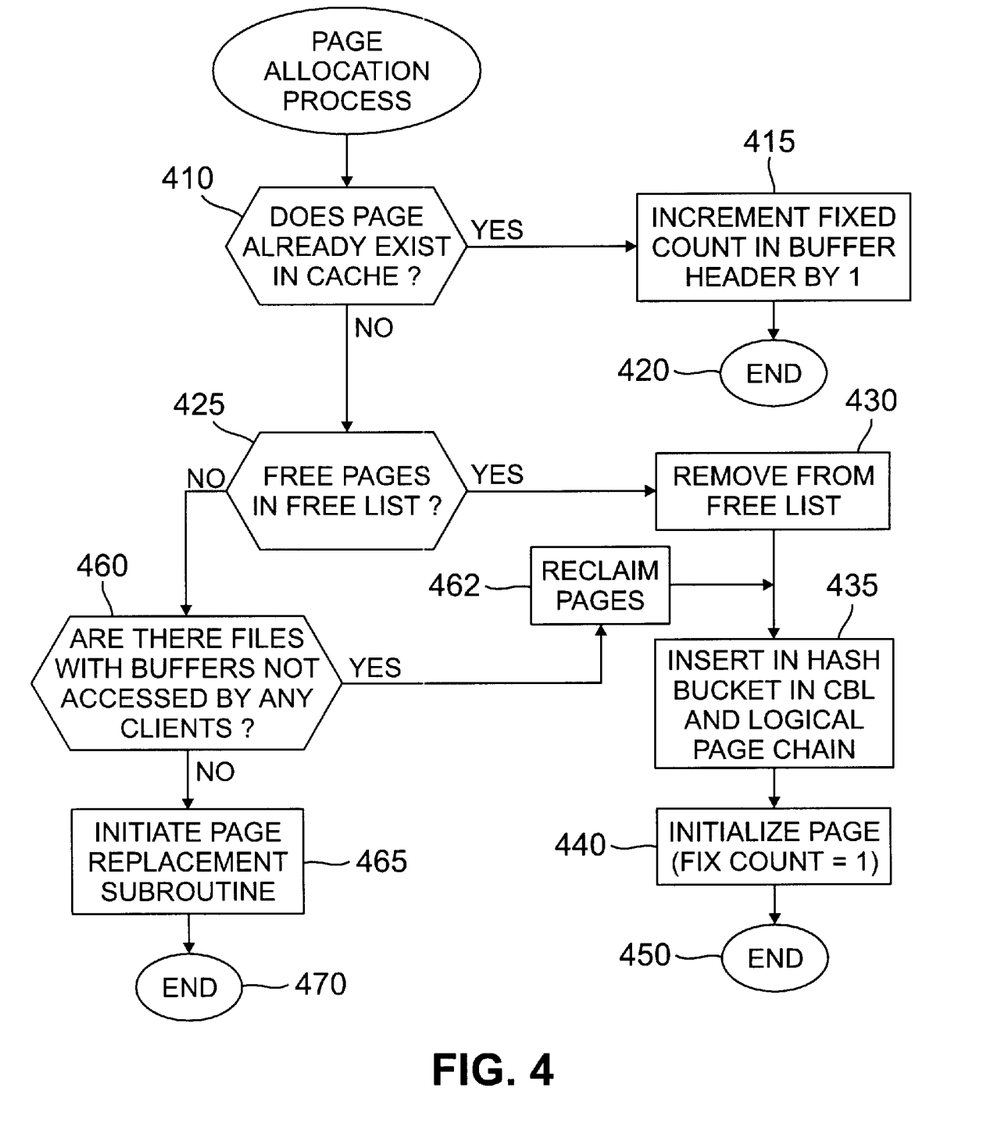
FIG. 4 is a flow chart describing an exemplary page allocation process of FIG. 3.

As discussed further below in conjunction with FIGS. 4 and 5, respectively, the data storage device 320 preferably includes a page allocation process 400 and a page replacement subroutine 500. Generally, the page allocation process 400 allocates a page 230 in the buffer cache 240 for data that will likely be accessed within a short period of time. The page replacement subroutine 500 is called by the page allocation process 400 if there are no free pages available in the cache. The page replacement subroutine 500 evaluates pages currently in use, determines which pages are least likely to be accessed, assembles a victim list of potential pages for replacement and overwrites one ore more pages with the desired page(s).

As previously indicated, the page allocation process 400 allocates a page 230 in the buffer cache 240 for data that will likely be accessed within a short period of time. As shown in FIG. 4, the page allocation process 400 initially performs a test during step 410 to determine if the desired page is already present in the cache. As previously indicated, this is preferably a S simple modulo division procedure. If it is determined during step 410 that the desired page is present in the cache, then the fixed count 268 in the buffer header 250 is incremented by one (1) during step 415, before program control terminates during step 420. It is noted that a page with a non-zero fix count is said to be fixed or pinned to the cache. As discussed below, a pinned page is not available for replacement, since it may be in use by some client. When a client has finished using the page, the fix count 268 of the page should be decremented by one (1) in order to unfix the page. A page whose fix count 268 is zero (0) is said to be unpinned.

If, however, it is determined during step 410 that the desired page is not present in the cache, then a further test is performed during step 425 to determine if there are any pages 230 in the free list 245. If it is determined during step 425 that there are pages 230 in the free list 245, then the desired number of pages are removed from the free list during step 430. Thereafter, the new pages are inserted into the appropriate hash bucket linked list 258 and in the logical page linked list 256 (FIG. 2A) during step 435. The page is initialized during step 440 by setting its fixed count 268 to one (1), before program control terminates during step 450.

If, however, it is determined during step 425 that there are no pages 230 in the free list 245, then yet another test is performed during step 460 to determine if there is a continuous media file with allocated buffers which is not being accessed by any clients. If it is determined during step 460 that there is a continuous media file with allocated buffers, then the unused pages are reclaimed during step 462 and program control continues to step 435 to initialize the pages in the manner described above.

If, however, it is determined during step 460 that there is no continuous media file with allocated buffers, then the page replacement subroutine 500 is executed during step 465 before program control terminates during step 470. As previously indicated, the page replacement subroutine 500 evaluates pages currently in use, determines which pages are least likely to be accessed, assembles a victim list of potential pages for replacement and overwrites one ore more pages with the desired page(s).

Figure 5:
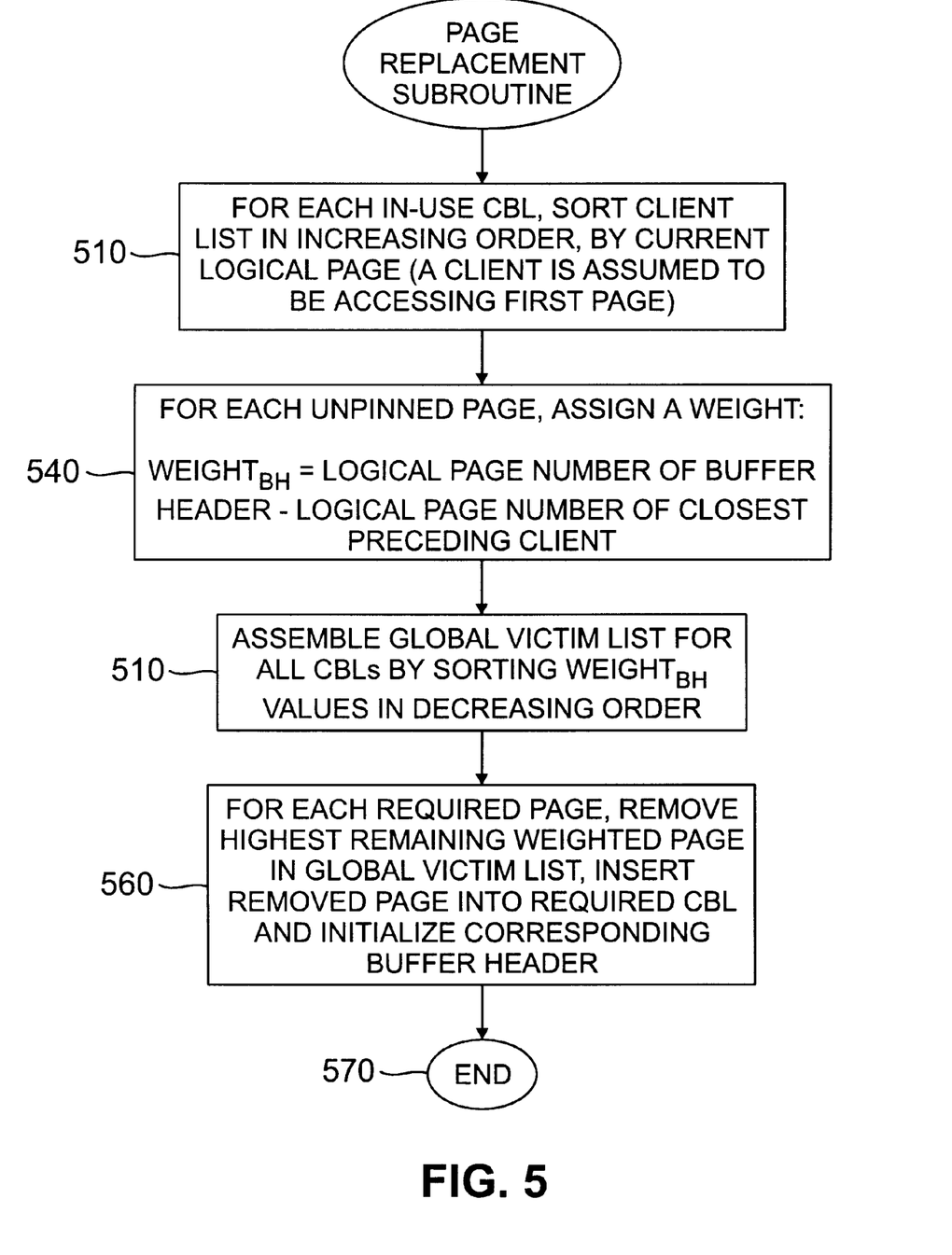
FIG. 5 is a flow chart describing an exemplary page replacement subroutine of FIG. 3.
Figure 6A:
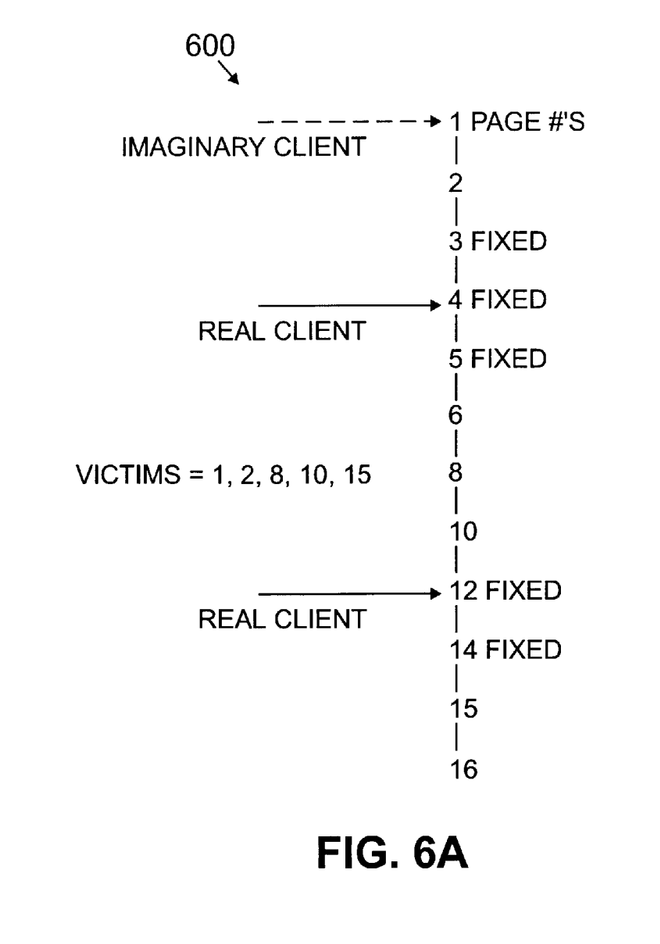
FIG. 6A illustrates a sorted client list generated by the page replacement subroutine of FIG. 5.

As shown in FIG. 5, the page replacement subroutine 500 initially creates and sorts a list of clients for each in-use CBL during step 510. As shown in FIG. 6A, the client list 600 is preferably sorted in increasing order, by the current logical page, and assumes that there is a client accessing the first page. Thereafter, for each unpinned page in the client list 600, the page replacement subroutine 500 assigns a weight during step 540. As previously indicated, a page whose fix count 268 is zero (0) is said to be unpinned. Unpinned pages are potential victims for replacement. The weight assigned to each unpinned page during step 540 is equal to the logical page number of the page minus the logical page number of the closest preceding page being accessed by a client. Thus, the basic strategy associated with the weighting disclosed herein is that a buffer with a larger weight will be accessed by a client later in time than a buffer with a smaller weight. Thus, it is assumed that clients are progressing in the forward direction at their respective data rates and no client has paused. A page associated with a larger weight will be accessed later and hence, should be replaced earlier.

Figure 6B:
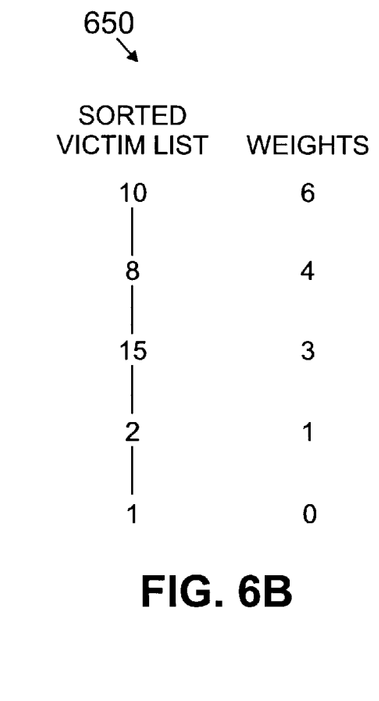
FIG. 6B illustrates a global victim list generated by the page replacement subroutine of FIG. 5.

The page replacement subroutine 500 then assembles a global victim list 650, shown in FIG. 6B, during step 550 for all in-use CBLs by sorting the weights calculated in the previous step for each buffer header in decreasing order. Thereafter, for each page which must be obtained, the page is inserted during step 560 from the head of the global victim list 650 into the appropriate CBL, and the corresponding buffer header is initialized (fixed count is set to one). Program control terminates during step 570.

As shown in the illustration of FIGS. 6A and 6B, there is one imaginary client accessing page one (1) and the potential victims for replacement are buffers having logical page numbers 1, 2, 8, 10 and 15, with corresponding weights 0, 1, 4, 6, and 3, respectively.

It is to be understood that the embodiments and variations shown and described herein are merely illustrative of the principles of this invention and that various modifications may be implemented by those skilled in the art without departing from the scope and spirit of the invention.

We claim:

1. A method of managing a buffer cache associated with a continuous media file, said buffer cache being comprised of a plurality of buffer pages, each of said buffer pages having an allocated state and a free state, said media file being accessed by a plurality of clients, said method comprising the steps of:

allocating said buffer pages to data from said media file that will likely be accessed by one or more of said clients; and replacing said allocated buffer pages with new data when no pages are in said free state, said pages for replacement being selected based on a distance of said allocated buffer pages from a page being accessed by at least one of said plurality of clients.

2. The method according to claim 1, further comprising the step of assigning a weight to said pages which may be replaced, wherein said weight is based on the likelihood that said clients progressing in the forward direction at a data rate will access said buffer page.

3. The method according to claim 1, further comprising the step of determining if said data from said media file is already in said buffer cache before performing said allocating step.

4. The method according to claim 3, wherein said buffer pages are stored in a hash array and said determining step comprises the step of performing a modulo division of the logical page number and the size of the hash array.

5. The method according to claim 4, wherein said modulo division result points to a bucket containing a buffer page, if said buffer page is present in said buffer cache.

6. The method according to claim 1, wherein said buffer pages have a logical page number determined by the sequential order in which said page will be accessed in the forward direction.

7. The method according to claim 1, wherein said pages of said continuous media file in said buffer cache may be accessed by a current buffer list.

8. The method according to claim 7, wherein said current buffer list includes information on accessing said pages.

9. The method according to claim 7, wherein said current buffer list includes information on said clients currently accessing said continuous media file.

10. A continuous media server, comprising:

at least one memory device for storing at least one continuous media file for delivery to a plurality of clients;

a buffer cache comprised of a plurality of buffer pages for storing portions of said continuous media file which are likely to be accessed by said clients, each of said buffer pages having an allocated state and a free state; and a processor to manage said buffer cache, said processor replacing said allocated buffer pages with new data when no pages are in said free state, said pages for replacement being selected based on a distance of said allocated buffer pages from a page being accessed by at least one of said plurality of clients.

11. The server according to claim 10, wherein said processor assigns a weight to said pages which may be replaced, said weight being based on the likelihood that said clients progressing in the forward direction at a data rate will access said buffer page.

12. The server according to claim 10, wherein said processor further determines if said data from said media file is already in said buffer cache before allocating a buffer page in said buffer cache.

13. The server according to claim 12, wherein said buffer pages are stored in a hash array and said determining operation performs a modulo division of the logical page number and the size of the hash array.

14. The server according to claim 13, wherein said modulo division result points to a bucket containing a buffer page, if said buffer page is present in said buffer cache.

15. The server according to claim 10, wherein said buffer pages having a logical page number determined by the sequential order in which said page will be accessed in the forward direction.

16. The server according to claim 10, wherein said pages of said continuous media file in said buffer cache are pointed to by a current buffer list.

17. The server according to claim 16, wherein said current buffer list includes information on accessing said pages.

18. The server according to claim 16, wherein said current buffer list includes information on said clients currently accessing said continuous media file.

19. A method of managing a buffer cache associated with a continuous media file, said buffer cache being comprised of a plurality of buffer pages, each of said buffer pages having an allocated state and a free state, said media file being accessed by a plurality of clients, said method comprising the steps of:

allocating said buffer pages to data from said media file that will likely be accessed by one or more of said clients; and replacing said allocated buffer pages with new data when no pages are in said free state, available in the cache, said replacing step further comprising the steps of:

evaluating said buffer pages currently in use;

assigning a weight to said in use buffer pages indicating buffer pages which are least likely to be accessed, said weight based on a distance of said allocated buffer pages from a page being accessed by at least one of said plurality of clients; and overwriting one or more in use buffer pages with said data from said media file based on said weight.

20. The method according to claim 19, further comprising the step of determining if said data from said media file is already in said buffer cache before performing said allocating step.

21. The method according to claim 20, wherein said buffer pages are stored in a hash array and said determining step comprises the step of performing a modulo division of the logical page number and the size of the hash array.

22. The method according to claim 21, wherein said modulo division result points to a bucket containing a buffer page, if said buffer page is present in said buffer cache.

23. The method according to claim 19, wherein said buffer pages have a logical page number determined by the sequential order in which said page will be accessed in the forward direction.

24. The method according to claim 19, wherein said pages of said continuous media file in said buffer cache are pointed to by a current buffer list.

25. The method according to claim 24, wherein said current buffer list includes information on accessing said pages.

26. The method according to claim 24, wherein said current buffer list includes information on said clients currently accessing said continuous media file.

* * * * *